No. 664,330.  
A. MACKAY.  
AMALGAM PRESS.  
(Application filed Nov. 27, 1899.)  
(No Model.)
Patented Dec. 18, 1900.
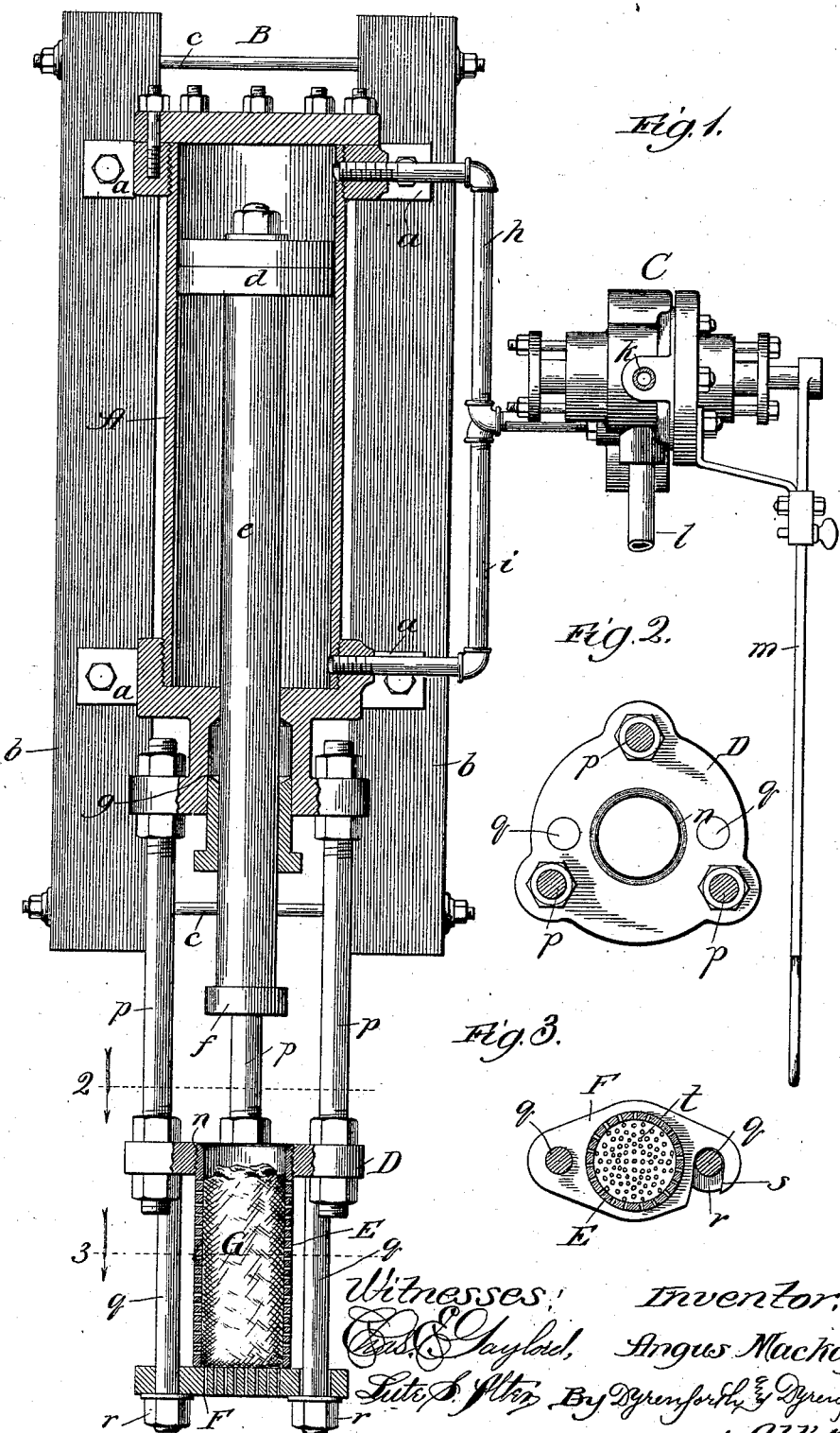

UNITED STATES PATENT OFFICE.

ANGUS MACKAY, OF DOUGLAS ISLAND, ALASKA TERRITORY, ASSIGNOR OF ONE-HALF TO ROBERT M. MEIN, OF SAN FRANCISCO, CALIFORNIA.

AMALGAM-PRESS.

SPECIFICATION forming part of Letters Patent No. 664,330, dated December 18, 1900.

Application filed November 27, 1899. Serial No. 738,385. (No model.)

*To all whom it may concern:*

Be it known that I, ANGUS MACKAY, a citizen of the United States, residing at Douglas Island, Alaska Territory, have invented a new and useful Improvement in Amalgam-Presses, of which the following is a specification.

My object is to provide a powerful and conveniently-operative device of improved construction for use in expressing the surplus quicksilver from amalgam.

In the accompanying drawings, Figure 1 is a vertical section of my improved device; and Figs. 2 and 3 are plan sections taken on lines 2 and 3, respectively, of Fig. 1.

A is a vertically-disposed cylinder fastened, as by means of the arms $a$ thereon, to a support B. The support may be of any suitable construction which will hold the device in a position convenient for operation, and the construction shown in the drawings comprises two vertical blocks $b$, held together with tie-bolts $c$ and adapted to be secured against a wall or the like. Working in the cylinder is a ram consisting of a piston $d$ on a stem $e$, provided at its lower end, preferably, with a head $f$. The upper end of the cylinder is closed, and the stem $e$ passes through a stuffing-box and gland $g$ in the lower end of the cylinder. In the upper and lower ends of the cylinder are ports communicating with the pipes $h$ $i$, leading thereto from a valve device C.

The valve device C is a four-way valve of usual construction, having an inlet-port $k$, exhaust $l$, ports communicating with the pipes $h$ $i$, and a valve operated by means of a handle $m$, which opens communication between the port $k$ and pipe $h$ or $i$ and at the same time opens communication between the other pipe $h$ or $i$ and the exhaust $l$. The valve may also be turned to a position to close both the ports of the pipes $h$ $i$. The port $k$ communicates by means of a suitable pipe (not shown) with a fluid-pressure supplier. The fluid may be steam, air, or water under pressure. Any suitable four-way valve may be employed which by the turning of a handle, such as the handle $m$, will operate to direct the fluid-pressure into the cylinder A either above or below the piston $d$, as desired, at the same time exhausting from the other side of the piston, and wherein the handle may be turned to a neutral position, whereby the pressure may be maintained neutral on both sides of the piston.

D is a plate having a central threaded opening $n$ and rigidly supported by three rods or bolts $p$, fastened at their upper ends in ears at the under side of the cylinder A and fastened at their lower ends to the said plate.

E is a wall or cylinder provided with numerous perforations and threaded along its upper end portion, at which it is screwed into the opening $n$, and thus secured to the plate D. Extending downward from the plate D at opposite sides of the cylinder E are bolts or rods $q$, threaded along their lower end portions and carrying nuts $r$.

F is a base-plate for the cylinder E, provided toward one end with an opening at which it loosely surrounds one rod $q$ and rests upon the nut $r$ thereof to swing in the horizontal plane. In the opposite end of the plate F is a recess $s$ to receive the other rod $q$ and at which the plate rests upon the nut $r$ on said rod when the plate is swung to its closed position. In that part of the plate F which forms the bottom of the cylinder is a series of openings $t$. The foraminous receptacle formed by the cylinder E and plate F is in direct line with the ram, and the head $f$ of the latter fits the cylinder with just sufficient looseness to move into and out of the same without material friction.

In operation the ram is raised to the position shown, and the plate F is swung to its closed position and tightened against the lower end of the cylinder E by means of the nuts $r$. A bag G, of canvas or other suitable porous and flexible material, containing the gold or silver or other amalgam, is introduced in the foraminous receptacle through its lower end previously to swinging the plate F to its closed position, and the handle $m$ is then moved to direct the fluid-pressure into the cylinder A above the piston and relieve the pressure below the piston. This causes the ram to be plunged downward into the receptacle and squeeze out from the amalgam the surplus quicksilver, which escapes through the perforations in the cylinder and plate F.

When this operation is completed, the valve C may be turned to the neutral position, the nuts r loosened, and the plate F swung from beneath the cylinder E, after which the piston may be again forced downward to cause the ram to discharge the bag G and contents from the receptacle. The handle m is then moved to direct pressure into the lower part of the cylinder A and exhaust the upper part thereof to move the ram to its raised position shown. Thus the operation of expressing the surplus quicksilver from bags of amalgam may be performed with comparatively great pressure quickly and effectively, and the construction of the parts subject to the pressure renders them particularly strong and durable.

While I prefer to construct my improvements throughout as shown and described, the construction may be modified in the matter of details without departing from the spirit of the invention as defined by the claim.

What I claim as new, and desire to secure by Letters Patent, is—

An appliance for expressing surplus quicksilver from amalgam, comprising, in combination, a frame, a threaded apertured plate, rods fixedly connecting the plate to the frame, a foraminous cylindrical receptacle having open ends and screwed at its top in the aperture of the plate, rods depending from the plate having nuts at their lower ends, a laterally-swinging perforated base-plate normally closing the lower end of the cylinder and pivoted to one of the depending rods and provided with a recess to engage the other depending rod the nuts forming supports for the base-plate, a ram movable in said receptacle, and means for actuating the ram to express the quicksilver from the amalgam, and to expel the latter through the open lower end of the receptacle when the base-plate is swung to its opening position.

ANGUS MACKAY.

In presence of—
  J. P. CORBUS,
  R. J. WILLIS.